US008042395B2

(12) United States Patent
Mayer-Wegelin et al.

(10) Patent No.: US 8,042,395 B2
(45) Date of Patent: Oct. 25, 2011

(54) METHOD FOR OPERATING A VIBRATING GYROSCOPE AND SENSOR ARRANGEMENT

(75) Inventors: Raphael Mayer-Wegelin, Friedrichsdorf (DE); Heinz-Werner Morell, Kaiserslautern (DE)

(73) Assignee: VDO Automotive AG, Regensburg (DE)

( * ) Notice: Subject to any disclaimer, the term of this patent is extended or adjusted under 35 U.S.C. 154(b) by 611 days.

(21) Appl. No.: 11/991,946

(22) PCT Filed: Aug. 29, 2006

(86) PCT No.: PCT/EP2006/065781
§ 371 (c)(1),
(2), (4) Date: Mar. 12, 2008

(87) PCT Pub. No.: WO2007/031402
PCT Pub. Date: Mar. 22, 2007

(65) Prior Publication Data
US 2009/0031805 A1 Feb. 5, 2009

(30) Foreign Application Priority Data
Sep. 12, 2005 (DE) .................. 10 2005 043 592

(51) Int. Cl.
*G01C 19/56* (2006.01)
(52) U.S. Cl. .................................................. 73/504.12
(58) Field of Classification Search ........... 73/504.04, 73/504.12, 504.02, 1.37, 1.77; 702/56, 96
See application file for complete search history.

(56) References Cited

U.S. PATENT DOCUMENTS

| | | | | |
|---|---|---|---|---|
| 5,226,321 A * | 7/1993 | Varnham et al. | ........... | 73/514.02 |
| 5,426,970 A * | 6/1995 | Florida et al. | ................... | 73/1.37 |
| 6,029,516 A * | 2/2000 | Mori et al. | ................. | 73/504.12 |
| 6,282,957 B1 * | 9/2001 | Akimoto et al. | ........... | 73/504.12 |
| 6,510,737 B1 * | 1/2003 | Hobbs | ........................ | 73/504.12 |
| 6,564,637 B1 * | 5/2003 | Schalk et al. | .............. | 73/504.12 |

FOREIGN PATENT DOCUMENTS

| | | |
|---|---|---|
| DE | 40 06 885 C2 | 10/1990 |
| DE | 196 53 577 B4 | 6/1995 |
| DE | 102 03 855 B4 | 8/2002 |
| DE | 102 40 087 B4 | 3/2004 |
| EP | 0 307 321 | 3/1989 |
| EP | 0 461 761 B1 | 12/1991 |

(Continued)

OTHER PUBLICATIONS

Search Report dated Dec. 5, 2006 for underlying International PCT Application No. PCT/EP2006/065781.

*Primary Examiner* — Helen C. Kwok
(74) *Attorney, Agent, or Firm* — Cozen O'Connor

(57) ABSTRACT

A method for operating a vibrating gyroscope, wherein the vibrating gyroscope is used as a resonator and forms part of at least one control circuit that excites the vibration gyroscope by feeding an excitation signal with its natural frequency. An output signal can be tapped from the vibrating gyroscope from which the excitation signal is derivable by filtering and amplification. Upon switching on a sensor arrangement that includes such a vibrating gyroscope, the frequency of the excitation signal is adjusted by exciting the vibrating gyroscope, before the excitation signal is fed, to oscillate freely, measuring the frequency of the free oscillation and feeding the excitation signal to the vibrating gyroscope with the measured frequency.

16 Claims, 2 Drawing Sheets

FOREIGN PATENT DOCUMENTS

| | | |
|---|---|---|
| EP | 1 600 732 A1 | 11/2005 |
| JP | 01-032113 | 2/1989 |
| JP | 09-218040 | 8/1997 |
| WO | WO 99/02942 | 1/1999 |
| WO | WO 2004/020948 A1 | 3/2004 |
| WO | WO 2005/001378 A1 | 1/2005 |
| WO | WO 2005/001381 A1 | 1/2005 |
| WO | WO 2005/075939 | 8/2005 |

* cited by examiner

METHOD FOR OPERATING A VIBRATING GYROSCOPE AND SENSOR ARRANGEMENT

CROSS REFERENCE TO RELATED APPLICATIONS

This is a U.S. national stage of application No. PCT/EP2006/065781, filed on Aug. 29, 2006. Priority is claimed on German application No. 10 2005 043 592.0, filed Sep. 12, 2005.

BACKGROUND OF THE INVENTION

The invention relates to a method for operation of a vibration gyro and a sensor arrangement having a vibration gyro, which represents a resonator and forms part of at least one control movement which excites the vibration gyro by supplying an exciter signal at its natural frequency, where an output signal can be tapped off from the vibration gyro and the exciter signal is derived from the output signal by filtering and amplification. By way of example, EP 0 461 761 B1 discloses rotation rate sensors in which a vibration gyro is excited on two axes which are aligned radially with respect to a major axis, for which purpose a primary and a secondary control loop are provided, with appropriate transducers on the vibration gyro. When rotation rate sensors such as these are used to stabilize the movement of a vehicle, the rotation rate sensor must operate immediately after the vehicle has been started up. However, this stabilization is delayed by the transient response of the secondary control loop.

SUMMARY OF THE INVENTION

It is an object of the present invention to speed up the transient response of a secondary control loop. These and other objects and advantages are achieved in accordance with the invention in that, once a sensor arrangement with the vibration gyro has been switched on, the frequency of the exciter signal is set by exciting the vibration gyro to oscillate freely before the exciter signal is supplied, with the frequency of the free oscillation being measured and with the exciter signal being supplied to the vibration gyro at the measured frequency.

A small amount of damping after the excitation means that the free oscillation, which decays in accordance with an exponential function, is available for a sufficiently long period of time for frequency measurement. For example, the frequency measurement can be performed as a measurement of the cycle duration by counting higher-frequency pulses.

In one advantageous embodiment, the vibration gyro is excited by moving a signal that is used for excitation through at least a predetermined frequency range, after which the signal is switched off and the frequency of a free oscillation that is formed is measured.

If the natural frequency may be in a higher frequency range than that predetermined, this contemplated embodiment may be modified such that a further frequency range is scanned through if no free oscillation has formed. In this case, it is possible to provide for the frequency ranges to be chosen such that, overall, they cover all the possible natural frequencies of the vibration gyro.

However, it is also possible to take precautions to ensure that the search for the natural frequency is restricted to a relatively narrow range. This is achieved, for example, in accordance with another embodiment, by choosing the frequency ranges such that they cover a previously measured natural frequency, stored in a memory, including its change area.

In another embodiment, the frequency ranges may overlap to avoid excluding any possible natural frequency from the search.

In a further embodiment, the frequency range is chosen such that it covers one actual frequency of the vibration gyro whose value is calculated from a stored value, its temperature dependency and the temperature measured at switch on. The stored value is the value which is measured at a predetermined temperature, for example 25° C., during an adjustment process for the vibration gyro and the sensor arrangement which contains the vibration gyro, and is stored in a non-volatile memory. In this case, the temperature during the adjustment process can also preferably be stored in the memory, possibly as well as the temperature dependency.

A sensor arrangement in accordance with the invention provides rapid stabilization of the control loop such that, once the sensor arrangement has been switched on, the frequency of the exciter signal is set such that, before the exciter signal is supplied, the vibration gyro is excited to oscillate freely. Here, the frequency of the free oscillation is measured and the exciter signal is supplied to the vibration gyro at the measured frequency.

The sensor arrangement in accordance with the invention includes means that preferably comprise a frequency measurement device, a microcontroller with a non-volatile memory, and a frequency synthesizer.

BRIEF DESCRIPTION OF THE DRAWINGS

The invention allows numerous embodiments. A number of these will be described in the following text and are illustrated schematically in a number of figures in the drawing, in which.

DETAILED DESCRIPTION OF THE PRESENTLY PREFERRED EMBODIMENTS

Figure 1:
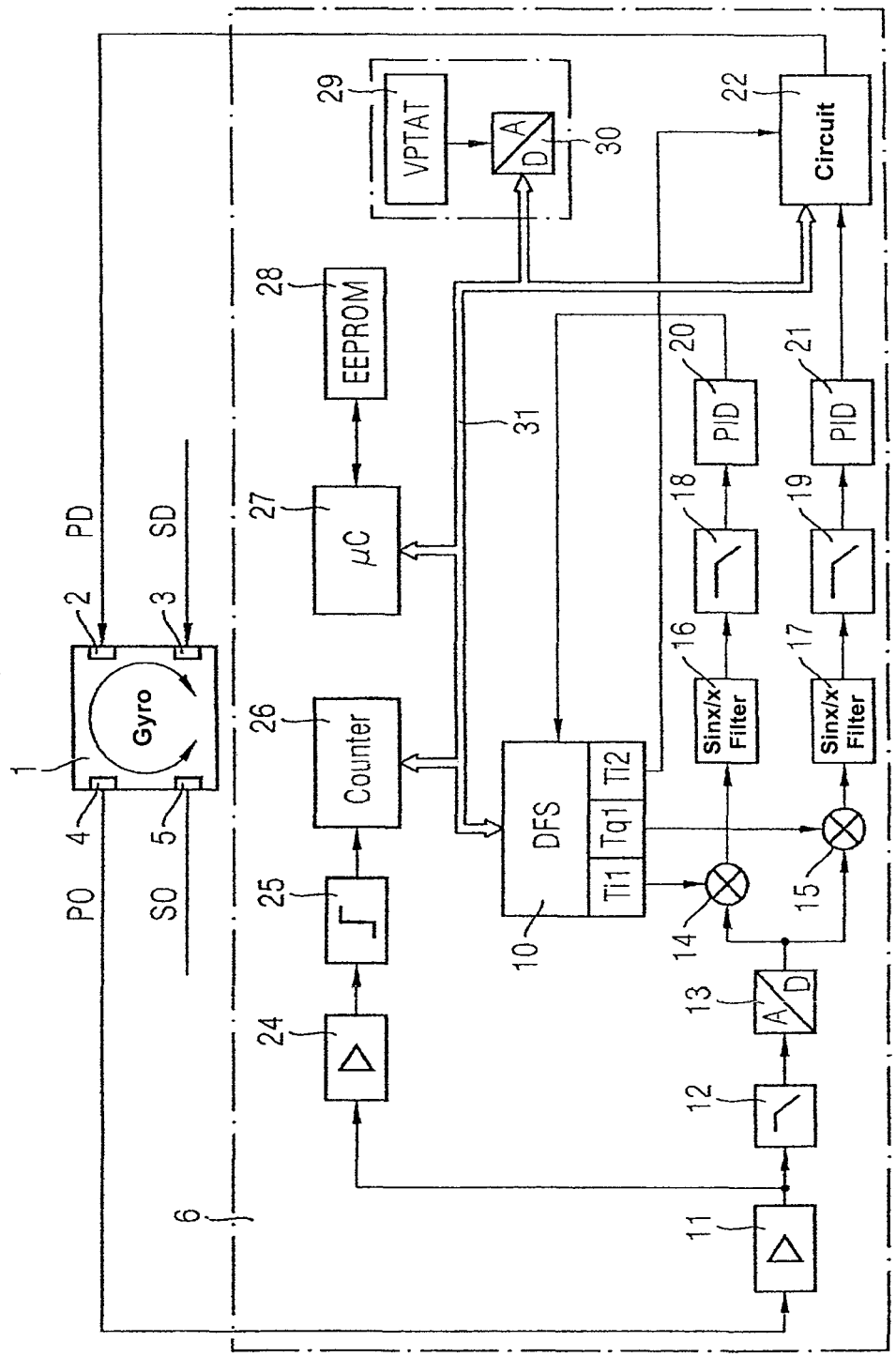
FIG. 1 shows a block diagram of a sensor arrangement with a vibration gyro, with the elements which are used to carry out the method in accordance the invention.

The sensor arrangement shown in FIG. 1 and portions thereof are illustrated as block diagrams. However, it is not the intention for the sensor arrangement of the invention to be restricted to implementation in the form of individual circuits corresponding to the blocks. In fact, the sensor arrangement of the invention can be implemented particularly advantageously through large-scale-integrated circuits. In this case, microprocessors can be used which implement the processing steps illustrated in the block diagrams when suitably programmed.

FIG. 1 shows a block diagram of a sensor arrangement with a vibration gyro 1 with two inputs 2, 3 for a primary exciter signal PD and a secondary exciter signal SD. The excitation is provided by suitable transducers, for example, electromagnetic transducers. The vibration gyro also has two outputs 4, 5 for a primary output signal PO and a secondary output signal SO. These signals reflect the respective vibration at physically different points on the gyro. Gyros such as these are known, for example, from EP 0 307 321 A1 and are based on the Coriolis force.

The vibration gyro 1 represents a high Q-factor filter, with the path between the input 2 and the output 4 being part of a primary control loop 6, and the path between the input 3 and the output 5 being part of a secondary control loop, which is not illustrated, since there is no need to explain it in order to understand the invention. The primary control loop 6 is used to excite oscillations at the resonant frequency of the vibration gyro, for example at 14 kHz. In this case, excitation is produced on one axis of the vibration gyro, with respect to which the oscillation direction used for the secondary control loop is offset through 90°. The signal SO is split in the secondary control loop not shown into two components, one of which can be tapped off, after suitable processing, as a signal which is proportional to the rotation rate.

The majority of the signal processing in both control loops is performed digitally. The clock signals required for signal processing are produced in a crystal-controlled digital frequency synthesizer 10, whose clock frequency in the illustrated example is 14.5 MHz. In accordance with an embodiment of the invention, the method is performed essentially by using the primary control loop. FIG. 1 illustrates one exemplary embodiment of the primary control loop.

The control loop has an amplifier 11 for the output signal PO, to which an anti-aliasing filter 12 and an analog/digital converter 13 are connected. Multipliers 14, 15, to which carriers Ti1 and Tq1 are supplied, are used to perform splitting of the output signal into an in-phase component and a quadrature component. The two components then respectively pass through a (sinx/x) filter 16, 17 and a low-pass filter 18, 19. The filtered real part is supplied to a PID regulator 20 which controls the digital frequency synthesizer, thus closing a phase control circuit which results in the phase angles of the Ti1 and Tq1 being correct. Furthermore, a carrier Tq2 is produced and is modulated in a circuit 22 with the output signal from a further PID regulator 21, which receives the low-pass-filtered imaginary part. The output signal from the circuit 22 is supplied to the input 2 of the vibration gyro 1 as the exciter signal PD. Depending on the specific preconditions, other regulators, for example PI regulators, may also be provided instead of the PID regulators.

A further amplifier 24, a Schmitt trigger 25 and a counter 26 are provided in order to implement the method of the invention. These act as a frequency measuring device. A microcontroller 27 controls the individual steps of the method of the invention and has access to a non-volatile memory 28 which is in the form of an EEPROM. Furthermore, a temperature sensor, which is provided in any case for many circuit arrangements and comprises an actual sensor 29 and an analog/digital converter 30, is used to implement the method of the invention. A bus system 31 connects the described components to one another and to the digital frequency synthesizer 10 as well as to the circuit 22.

Figure 2:
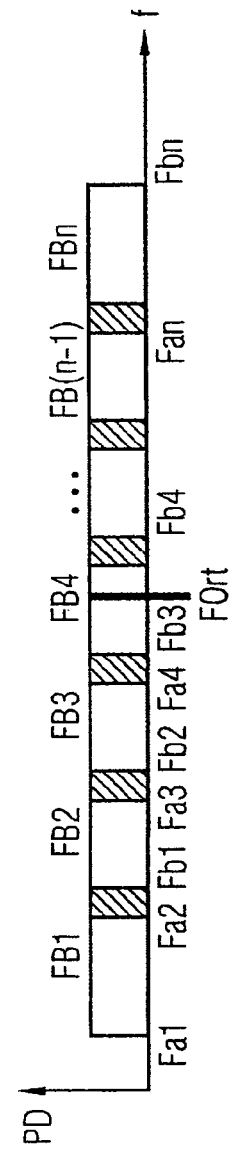
FIG. 2 shows a graphical illustration of frequency ranges which are provided for a first exemplary embodiment of the method according to the invention.
Figure 3:
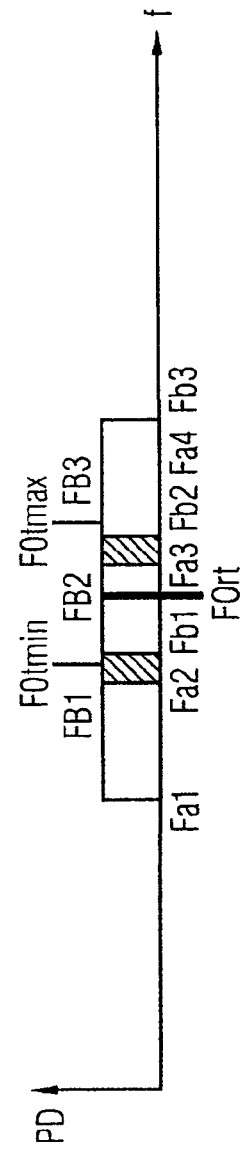
FIG. 3 shows a graphical illustration of frequency ranges for the second exemplary embodiment.
Figure 4:
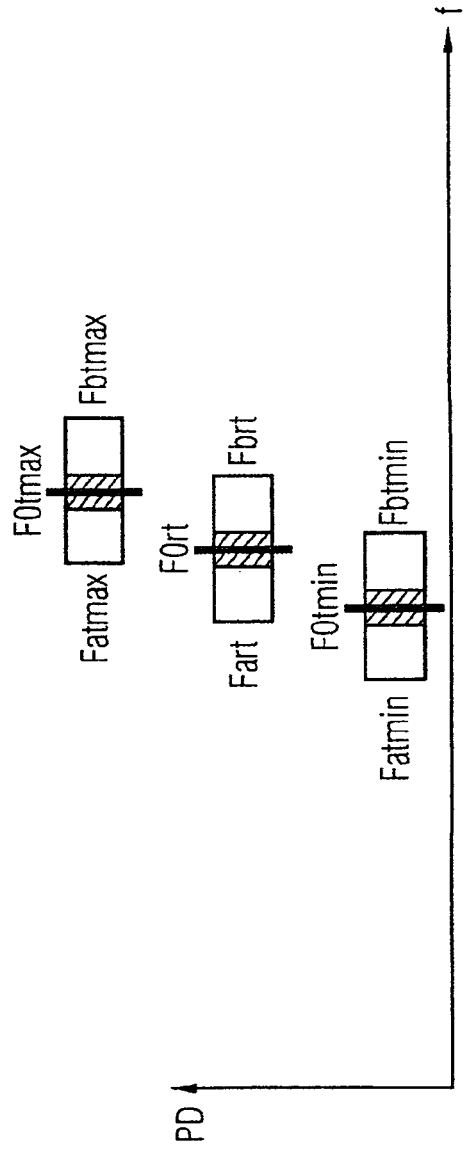
FIG. 4 shows a graphical illustration of frequency ranges for a third exemplary embodiment.

In order to implement the method in accordance with the invention, the microcontroller 27 controls the frequency synthesizer 10 and the circuit 22 such that the excitation signals, which will be explained in more detail later in conjunction with FIGS. 2 to 4, are supplied to the input 2 of the vibration gyro 1. In this case, by way of example, the control loop is interrupted by interrupting the clocks Ti1 and Tq1.

In the exemplary embodiment illustrated in FIG. 2, the entire range within which the natural frequency F0rt may occur is subdivided into a plurality of frequency ranges FB1 to FB(n+1). One frequency range in each case extends from a frequency Fa to Fb, with the ranges overlapping in the part that is illustrated in a shaded form. Once the sensor arrangement has been switched on, the frequency range Fa1 to Fb1 is first scanned through, followed by the frequency range Fa2 to Fb2, and then the frequency range Fa3 to Fb3. Free oscillation at the frequency F0rt is excited only in the frequency range between Fa4 and Fb4. This is detected with the aid of the counter 26 (FIG. 1), which signals the measured frequency to the microcontroller 27, in response to which the frequency synthesizer 10 is set to this frequency.

By way of example, in the case of a vibration gyro whose natural frequency may be between 13.5 kHz and 14.5 kHz, the frequency range is split into ten frequency ranges of 100 Hz each, plus 35 Hz for the overlap. By way of example, 10 ms has been found to be appropriate for the time which is required to scan through a frequency range.

In the exemplary embodiment shown in FIG. 3, the frequency F0rt, which in each case occurred in test conditions, was measured and stored in the EEPROM 28 (FIG. 1) in an adjustment process during the production of the sensor arrangement. When the sensor arrangement is switched on and when searching for the natural frequency F0rt, there is no longer any need to account for "scatters" in the natural frequency between different items of equipment. The search process therefore has to only take into account changes from the natural frequency during adjustment. These are primarily temperature influences or aging phenomena. In the exemplary embodiment shown in FIG. 3, just three frequency ranges FB1 to FB3 are therefore provided, covering changes in the natural frequency between F0tmin and F0tmax.

In the exemplary embodiment shown in FIG. 4, in addition to the natural frequency of the vibration gyro during adjustment, its temperature coefficient and the temperature on switch on are also taken into account. In the illustrated situation, all that is therefore required is to scan through one frequency range in each case, whose position is shown in FIG. 4 for a medium temperature Rt, for a minimum temperature tmin and for a maximum temperature tmax, as is in each case indicated by the indices for the frequencies F0, Fa and Fb. The shaded areas each represent the coverage range of the control loop (PLL circuit).

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operation of a vibration gyroscope, which includes a resonator and forms a part of at least one control loop which supplies an exciter signal at a natural frequency to excite the vibration gyroscope, wherein an output signal is tapable from the vibration gyroscope and the exciter signal is derivable from said output signal by filtering and amplification, the method comprising:

switching on a sensor arrangement having the vibration gyroscope;

exciting the vibration gyroscope sequentially at a plurality of frequency ranges to oscillate freely before the exciter signal is supplied to set a frequency of the exciter signal, after the sensor arrangement with the vibration gyroscope has been switched on;

measuring a frequency of the freely oscillating gyroscope; and supplying the exciter signal to the vibration gyroscope at the measured frequency of the freely oscillating gyroscope.

2. The method as claimed in claim 1, wherein the step of exciting further comprises:

moving the exciter signal through a predetermined frequency range to excite the gyroscope, after which the exciter signal is switched off; and measuring the frequency of a free oscillation that is formed.

3. The method as claimed in claim 2, wherein the step of exciting further comprises:

scanning a further frequency range through if no free oscillation has formed in said step of measuring the frequency of the free oscillation.

4. The method as claimed in claim 3, wherein the predetermined and further frequency ranges are selected such that, overall, the predetermined and further frequency ranges cover all possible natural frequencies of the vibration gyroscope.

5. The method as claimed in claim 3, wherein the predetermined and further frequency ranges are selected such that the predetermined and further frequency ranges cover a previously measured natural frequency, stored in a memory, including a change area of the previously measured natural frequency.

6. The method as claimed in claim 3, wherein the predetermined and further frequency ranges overlap.

7. The method as claimed in claim 2, wherein the predetermined frequency range is selected such that the predetermined frequency range covers one natural frequency of the vibration gyroscope whose value is calculated from a stored value, a temperature dependency of the value and a temperature measured at the time that the sensor arrangement is switched on.

8. A sensor arrangement comprising:

a vibration gyroscope which includes a resonator and forms part of at least one control loop which supplies an exciter signal at a natural frequency to excite the vibration gyroscope, wherein an output signal is tapable from the vibration gyroscope and the exciter signal is derivable from said output signal by filtering and amplification; and means for achieving rapid stabilization of the at least one control loop by switching on a sensor arrangement having the vibration gyroscope; exciting the vibration gyroscope sequentially at a plurality of frequency ranges to oscillate freely before the exciter signal is supplied to set a frequency of the exciter signal, after the sensor arrangement with the vibration gyroscope has been switched on; measuring the frequency of the freely oscillating gyroscope; and supplying the exciter signal to the vibration gyroscope at the measured frequency.

9. The sensor arrangement as claimed in claim 8, wherein the means comprise a frequency measurement device, a microcontroller with a non-volatile memory, and a frequency synthesizer.

10. The sensor arrangement as claimed in claim 8, wherein the vibration gyroscope is excited to oscillate freely by moving a signal through at least one predetermined frequency range, after which the signal is switched off and the frequency of a free oscillation that is formed is measured.

11. The sensor arrangement as claimed in claim 9, wherein the vibration gyroscope is excited to oscillate freely by moving a signal through at least one predetermined frequency range, after which the signal is switched off and the frequency of a free oscillation that is formed is measured.

12. The sensor arrangement as claimed in claim 11, wherein the means comprise means for scanning through a further frequency range if no free oscillation has formed.

13. The sensor arrangement as claimed in claim 12, wherein the predetermined and further frequency ranges are selected such that, overall, the predetermined and further frequency ranges cover all possible natural frequencies of the vibration gyroscope.

14. The sensor arrangement as claimed in claim 12, wherein the predetermined and further frequency ranges are selected such that the predetermined and further frequency ranges cover a previously measured natural frequency, stored in a memory, including a change area of the previously measured natural frequency.

15. The sensor arrangement as claimed of claim 12, wherein the predetermined and further frequency ranges overlap.

16. The sensor arrangement as claimed in claim 11, wherein the predetermined frequency range is selected such that the predetermined frequency range covers one natural frequency of the vibration gyroscope whose value is calculated from a stored value, a temperature dependency of the value and a temperature measured at a time the vibration gyroscope is switched on.

\* \* \* \* \*